US012539036B2

(12) United States Patent
Mabuchi et al.

(10) Patent No.: US 12,539,036 B2
(45) Date of Patent: Feb. 3, 2026

(54) OPHTHALMOLOGIC IMAGING METHOD, OPHTHALMOLOGIC IMAGING DEVICE, AND STORAGE MEDIUM FOR STORING OPHTHALMOLOGIC IMAGING CONTROL PROGRAM

(71) Applicant: NIDEK CO., LTD., Gamagori (JP)

(72) Inventors: Hikaru Mabuchi, Gamagori (JP); Hideki Aono, Gamagori (JP); Yukihiro Higuchi, Gamagori (JP)

(73) Assignee: NIDEK CO., LTD.

( * ) Notice: Subject to any disclaimer, the term of this patent is extended or adjusted under 35 U.S.C. 154(b) by 333 days.

(21) Appl. No.: 18/345,290

(22) Filed: Jun. 30, 2023

(65) Prior Publication Data

US 2024/0008737 A1    Jan. 11, 2024

(30) Foreign Application Priority Data

Jul. 5, 2022   (JP) ................................. 2022-108376

(51) Int. Cl.
*A61B 3/10*   (2006.01)
*A61B 3/12*   (2006.01)

(52) U.S. Cl.
CPC ................ *A61B 3/102* (2013.01); *A61B 3/12* (2013.01)

(58) Field of Classification Search
CPC .................................. A61B 3/102; A61B 3/12
USPC ......................................................... 351/206
See application file for complete search history.

(56) References Cited

U.S. PATENT DOCUMENTS

| | | | |
|---|---|---|---|
| 10,362,933 B2* | 7/2019 | Goto | A61B 3/102 |
| 2013/0229622 A1 | 9/2013 | Murase et al. | |
| 2014/0063452 A1* | 3/2014 | Aoki | A61B 3/0091 |
| | | | 351/221 |
| 2015/0272435 A1* | 10/2015 | Ito | A61B 3/14 |
| | | | 351/206 |
| 2016/0089024 A1* | 3/2016 | Katashiba | A61B 3/12 |
| | | | 351/221 |
| 2016/0287068 A1 | 10/2016 | Murase et al. | |
| 2016/0324417 A1* | 11/2016 | Muto | A61B 3/102 |
| 2018/0199806 A1 | 7/2018 | Dziubak | |
| 2021/0204809 A1* | 7/2021 | Hirose | A61B 3/12 |

FOREIGN PATENT DOCUMENTS

JP   2013-180125 A   9/2013
JP   2016133550 A    7/2016

* cited by examiner

*Primary Examiner* — Mohammed A Hasan
(74) *Attorney, Agent, or Firm* — Best Mode IP Law, PLLC; Yusuke Hirai (57) ABSTRACT

An ophthalmologic imaging method is implemented by an control unit of an ophthalmologic imaging device for acquiring entire image data of the tissue by repeatedly performing the steps of: setting a scanning position; acquiring the partial image data by applying, to an optical scanning unit, a driving signal that causes the optical scanning unit to scan light on a tissue of a subject eye at the scanning position that was set this time; and continuously operating the optical scanning unit after capturing the partial image data based on the scanning position that was set this time was completed by applying, to the optical scanning unit, a continuous driving signal.

8 Claims, 6 Drawing Sheets

OPHTHALMOLOGIC IMAGING METHOD, OPHTHALMOLOGIC IMAGING DEVICE, AND STORAGE MEDIUM FOR STORING OPHTHALMOLOGIC IMAGING CONTROL PROGRAM

CROSS REFERENCE TO RELATED APPLICATION

This application is based on, and claims the benefit of priority from, Japanese Patent Application No. 2022-108376 filed on Jul. 5, 2022. The entire disclosure of the above application is incorporated herein by reference.

TECHNICAL FIELD

The present disclosure relates to an ophthalmologic imaging method, an ophthalmologic imaging device that captures images of a tissue in the subject eye by scanning the tissue with light, and an ophthalmologic imaging control program that is executed in the ophthalmologic imaging device.

BACKGROUND

An ophthalmologic imaging device that captures images of a tissue in the subject eye by scanning the tissue with light has been known. The ophthalmologic imaging device, during a single image capturing operation, may repeatedly perform setting the scanning position for light and driving control of an optical scanning unit for emitting light at the set scanning position. Such an ophthalmologic imaging device corrects the scanning position of light based on the positional deviation of a front image, in which the acquisition position of tomographic images is set, from the live image of the tissue of the subject eye. The ophthalmologic imaging device controls operation of the optical scanning unit to emit light to the corrected scanning position, thereby tracking the measurement light to a predetermined acquisition position on the subject eye.

SUMMARY

If the time required for capturing images increases, the burden on the subject and the risk of image quality deterioration due to the movement of the subject eye during capturing images would also increase. Therefore, it is desirable in an ophthalmologic imaging device to minimize the image capturing time as much as possible. The inventors of the present disclosure have newly found a method for shortening the image capturing time by reducing the time between the end of the drive of the optical scanning unit to emit light to a scanning position and the actual start of driving the optical scanning unit to emit light to the next scanning position during a single image capturing operation.

One of typical objectives of the present disclosure is to provide an ophthalmologic imaging method, an ophthalmologic imaging device, and an ophthalmologic imaging control program that can appropriately shorten the time required for capturing images of the subject eye by performing light scanning.

An ophthalmologic imaging method according to a first aspect of the present disclosure is implemented by a control unit of an ophthalmologic imaging device that is configured to capture an image of a tissue of a subject eye. The ophthalmologic imaging device includes: a light source configured to emit light; an optical scanning unit that includes a deflection portion configured to deflect light emitted from the light source, the optical scanning unit being configured to sequentially scan light on the tissue at a plurality of scanning positions; and a light receiving element that is configured to receive light reflected by the tissue scanned by the optical scanning unit. The method is implemented to acquire entire image data of the tissue by repeatedly performing the steps of: setting a scanning position of light for the optical scanning unit to acquire partial image data that is part of the entire image data; acquiring the partial image data via the light receiving element by applying, to the optical scanning unit, a driving signal that causes the optical scanning unit to scan light on the tissue at the scanning position that was set this time; and continuously operating the optical scanning unit until capturing the partial image data based on a scanning position that will be set next time starts after capturing the partial image data based on the scanning position that was set this time was completed by applying, to the optical scanning unit, a continuous driving signal that causes the optical scanning unit to continuously operate.

An ophthalmologic imaging device according to a second aspect of the present disclosure is configured to capture an image of a tissue of a subject eye. The ophthalmologic imaging device includes: a light source configured to emit light; an optical scanning unit that includes a deflection portion configured to deflect light emitted from the light source, the optical scanning unit being configured to sequentially scan light on the tissue at a plurality of scanning positions; a light receiving element that is configured to receive light reflected by the tissue scanned by the optical scanning unit; and a control unit that includes at least one processor. The at least one processor is programmed to repeatedly perform, to acquire entire image data of the tissue: a scanning position setting operation to seta scanning position of light for the optical scanning unit; a partial image data acquisition operation to acquire, via the light receiving element, partial image data that is part of the entire image data by applying, to the optical scanning unit, a driving signal that causes the optical scanning unit to scan light on the tissue at the scanning position that was set this time; and a continuous driving operation to cause the optical scanning unit to continuously perform an operation other than the partial image data acquisition operation until the partial image data acquisition operation based on a scanning position that will be set next time starts after the partial image data acquisition operation based on the scanning position that was set this time was completed by applying, to the optical scanning unit, a continuous driving signal that causes the optical scanning unit to continuously operate.

A non-transitory, computer-readable, tangible storage medium according to a third aspect of the present disclosure stores an ophthalmologic image capturing program, which is executed by at least one processor of an ophthalmologic imaging device configured to capture an image of a tissue of a subject eye. The ophthalmologic imaging device includes: a light source configured to emit light; an optical scanning unit that includes a deflection portion configured to deflect light emitted from the light source, the optical scanning unit being configured to sequentially scan light on the tissue at a plurality of scanning positions; a light receiving element that is configured to receive light reflected by the tissue scanned by the optical scanning unit; and a control unit that includes the at least one processor. The program, when executed by the at least one processor, causes the at least one processor to repeatedly perform, to acquire entire image data of the tissue: a scanning position setting operation to set a scanning position of light for the optical scanning unit; a partial image data acquisition operation to acquire, via the light receiving element, partial image data that is part of the entire image data by applying, to the optical scanning unit, a driving signal that causes the optical scanning unit to scan light on the tissue at the scanning position that was set this time; and a continuous driving operation to cause the optical scanning unit to continuously perform an operation other than the partial image data acquisition operation until the partial image data acquisition operation based on a scanning position that will be set next time starts after the partial image data acquisition operation based on the scanning position that was set this time was completed by applying, to the optical scanning unit, a continuous driving signal that causes the optical scanning unit to continuously operate.

According to the ophthalmologic imaging method, the ophthalmologic imaging device, and the ophthalmologic imaging control program related to this disclosure, the time required for capturing the images of the subject eye by performing light scanning is appropriately shortened.

DESCRIPTION OF EMBODIMENTS

Summary

The ophthalmologic imaging device exemplified in this disclosure captures an image of a tissue of a subject eye. The ophthalmologic imaging device is equipped with a light source, an optical scanning unit, a light receiving element, and a control unit. The light source emits light. The optical scanning unit has a deflection portion that deflects the light emitted by the light source, and it scans the tissue with light in a controllable state of light emitting position and speed on the tissue. The light receiving element receives light from the tissue irradiated by the light emitted by the optical scanning unit. The control unit repeatedly executes a scanning position setting step and a partial image data acquisition operation from the start to the end of one image data acquisition process (image data acquisition according to a scanning pattern (for example, map scan etc.) including multiple scanning positions). At the scanning position setting step, the control unit sets the scanning position for the light emitted from the optical scanning unit for acquiring partial image data, which is a part of the image data. At the partial image data acquisition operation, while driving the optical scanning unit by applying a driving signal for emitting light at the scanning position set in the scanning position setting step to the optical scanning unit, partial image data is acquired through the light receiving element. Furthermore, the control unit executes, between the partial image data acquisition operations, a continuous driving operation to cause the optical scanning unit to perform an operation other than the operation for acquiring image data by applying a continuous driving signal that causes the optical scanning unit to continuously operate until the next partial image data acquisition operation starts.

Typical ophthalmologic imaging devices is controlled to suspend operation of the optical scanning unit when the optical scanning unit completed light scanning at a scanning position (that is, scanning a target with light at one scanning position) until the optical scanning unit starts light scanning at a newly set scanning position. However, the optical scanning unit has a characteristic that requires some time from the timing of applying a driving signal after it was suspended to the timing of actually resuming operation. For example, one of reasons is that the optical scanning unit requires time to resume its operation since there is time lag between the timing of applying a driving signal by the control unit to the optical scanning unit and the timing of receiving a feedback signal from the optical scanning unit by the driver. In this case, the driver cannot allow operation of the optical scanning unit to resume light scanning at the next scanning position until the driver receives the feedback signal. Therefore, it takes time for the optical scanning unit to resume light scanning operation. There might also be another reason is that the light scanning operation resumes slowly due to insufficient tracking performance by a deflection portion of the optical scanning unit. Furthermore, typical ophthalmologic devices sometimes control the deflection portion so that the light emitting position is located outside of the capturing angle in order to prevent continuous light irradiation on the tissue at the same position during suspension of the scanning operation of the optical scanning unit. In this case, the timing of resuming the light scanning at the next scanning position would be further delayed.

In contrast, in the ophthalmologic imaging device in this disclosure, at least one of continuous driving operation signals is applied to the optical scanning unit between the partial image data acquisition operations to cause the optical scanning unit to continuously operate (i.e., move) until the start of the partial image data acquisition operation at the next scanning position. In other words, by deliberately causing the optical scanning unit to perform an operation other than the operation for acquiring image data between the repeatedly performed partial image data acquisition operations, the optical scanning unit is controlled to continuously operate (i.e., does not suspend operation between the partial image data acquisition operations). As a result, the optical scanning unit shifts the driving state from the operation based on the continuous driving operation signal (hereinafter, referred to as "continuous driving operation") to the partial image data acquisition operation at the next scanning position without suspending operation. Therefore, it is possible to effectively shorten the time period between the timing of completing the partial image data acquisition operation at a scanning position and the timing of resuming the partial image data acquisition operation at a next scanning position.

In other words, in the ophthalmologic imaging device in this disclosure, even though intervals between the multiple partial image acquisition operations generate, by applying a continuous driving signal to the optical scanning unit, each of the intervals can be shortened in time. With the accumulated shortening of the intervals, the total time necessary to capture an image can be shortened.

In embodiments described below, the ophthalmologic imaging device applies a continuous driving signal to the optical scanning unit so that the optical scanning unit continues its operation during the transition time between the multiple partial image data acquisition operations (that is, transition time between the light scanning operations at the multiple scanning positions). In other words, in the embodiments described below, the optical scanning unit never suspend its operation after the light scanning operation at a scanning position completed until the light scanning operation at the next scanning position resumes (in other words, in the embodiments described below, the driving signal is continuously applied to the optical scanning unit even during the transition time between the light scanning performances at the scanning positions). However, it is sufficient as long as the continuous driving operation is performed at least at the timing of resuming the partial image data acquisition operation at the next scanning position. Therefore, for example, even if the control unit temporally stops applying the driving signal to the optical scanning unit after the partial image data acquisition operation at a scanning position completed and then immediately applies the continuous driving operation signal, the time period necessary to capture an image can be appropriately shortened as compared to the conventional way.

The control unit may temporarily stop or block emission of light from the light source to the tissue during the continuous driving operation or may continue to emit light during the continuous driving operation. The scanning position indicates the position on the tissue onto which the light is projected (in the embodiments described below, it indicates the positions on the tissue in a scanning line along which the light is projected).

In the embodiments described below, an OCT (Optical Coherence Tomography) device for capturing a fundus of the subject eye is described as an ophthalmologic imaging device that captures an image of a tissue of the subject eye by scanning the tissue with light. However, the ophthalmologic imaging device in this disclosure is not necessarily limited to an OCT device for capturing the fundus. For example, the technology described in this disclosure can be applied to various ophthalmologic imaging devices that capture images of tissues by non-resonantly driving an optical scanning unit, such as a laser scanning ophthalmoscope (SLO) that captures a two-dimensional front image of the fundus and an OCT device that captures the anterior segment of the subject eye.

In the embodiment described below, two galvanic scanners are used as the optical scanning unit. However, the optical scanning unit driven by the aforementioned driving signal (including the continuous driving signal) is not necessarily limited to a galvanic scanner, as long as the optical scanning unit is capable of controlling the light position and speed of light while projecting the light onto the tissue. For example, it is possible to use a device that is configured to oscillate a deflection portion (such as a mirror) in a non-resonant manner as the optical scanning unit. A device that is oscillated by non-resonant driving may be a piezo scanner or a MEMS scanner. Furthermore, the ophthalmologic imaging device may have multiple optical scanning units (for example, optical scanning units that are oscillated by non-resonant driving) that are configured to control the light projection position and speed or may have only a single optical scanning unit. If the ophthalmologic imaging device is equipped with multiple optical scanning units, a continuous driving signal may be applied to each of the multiple optical scanning units or only to some of the optical scanning units. The ophthalmologic imaging device may also be equipped with both an optical scanning unit oscillated by non-resonant driving and other scanning units (for example, an optical scanning unit driven in resonance or an optical scanning unit that continuously rotates the deflection portion). In this case, the continuous driving signal needs to be applied to at least one of the optical scanning units oscillated by non-resonant driving. It should be noted that an optical scanning unit that is oscillated by non-resonant driving has a characteristic that is able to strictly control the deflection angle of light by the deflection portion according to the magnitude of the driving signal, unlike an optical scanning unit that is driven in resonance.

In the continuous driving operation, the control unit may apply a continuous driving signal, which causes the optical scanning unit to project light at the scanning position that was set in the previously-executed partial image data acquisition operation, to the optical scanning unit until the next partial image data acquisition operation starts. In this case, the control unit can use the driving signal used in the previous partial image data acquisition operation as the continuous driving signal, and thus there is no need to newly generate the continuous driving signal. Therefore, the time necessary to capture an image can be appropriately shortened with simple control.

In the continuous driving operation, the control unit may apply a continuous driving signal, which causes the optical scanning unit to project light at a part of the scanning position (i.e., a part of the scanning line) that was set in the previously-executed partial image data acquisition operation, to the optical scanning unit until the next partial image data acquisition operation starts. In this case, the control unit can generate a continuous driving signal using the driving signal that was used to project light at the previous scanning position, and thus the control can be simplified. Also, compared to using a continuous driving signal that causes the optical scanning unit to project light over the entire previous scanning position (i.e., the entire scanning line), it is easier to shorten the time required for completing a single continuous driving operation. Therefore, if setting of the next scanning position is completed during the continuous driving operation of the optical scanning unit, the average time from the end of the continuous driving operation to the start of the partial image data acquisition operation at the next scanning position is likely to be further shortened.

The ophthalmologic imaging device may further include a front observation optical system for capturing a front image of the tissue of the subject eye. In the scanning position setting step, the control unit may detect a positional deviation between the front image captured in real-time (i.e., currently) by the front observation optical system and the front image captured in the past, and set the next scanning position based on the detected positional deviation. In this case, even if the tissue of interest in the subject eye moves during the image capturing operation, the ophthalmologic imaging device can set multiple scanning positions appropriately on the tissue by setting the next scanning position according to the positional deviation caused by movement of the tissue. In other words, the ophthalmologic imaging device can perform a tracking process that follows the scanning position of light according to the movement of the tissue. Furthermore, by applying a continuous driving signal to the optical scanning unit, the time from the end of the drive of the optical scanning unit corresponding to one scanning position to the actual start of the drive of the optical scanning unit corresponding to the next scanning position is appropriately shortened. Therefore, the shooting time of high-quality images using tracking can be appropriately shortened.

The ophthalmologic imaging device may be an OCT device that splits light emitted from an OCT light source into measurement light and reference light, and acquires an OCT signal by receiving interference light of the reference light and the measurement light reflected by the tissue. The ophthalmologic imaging device may perform the scanning position setting operation, partial image data acquisition operation, and continuous driving operation during the acquisition (capturing) of OCT angiography data. OCT angiography data is motion contrast data generated by calculating at least two OCT signals acquired at different times for the same position of the subject eye. That is, when acquiring OCT angiography data, the ophthalmologic imaging device needs to project light multiple times on the same scanning position. Therefore, it was difficult to shorten the time necessary to capture the image data with conventional technology. However, by applying the technology exemplified in this disclosure, the time required to capture OCT angiography data can be appropriately shortened. Also, the ophthalmologic imaging device may perform the scanning position setting operation, partial image data acquisition operation, and continuous driving operation when acquiring (capturing) OCT angiography data while performing the aforementioned tracking processing. In this case, the time required to capture high-quality OCT angiography data using tracking can be appropriately shortened.

It is also possible to adopt the technology exemplified in this disclosure when acquiring image data other than OCT angiography data. For example, the ophthalmologic imaging device (OCT device) may perform the scanning position setting operation, partial image data acquisition operation, and continuous driving operation when performing averaging by adding multiple tomographic images captured by projecting light multiple times on the same scanning line. In this case, too, the ophthalmologic imaging device may perform the tracking processing. Furthermore, as described above, it is also possible to apply the technology exemplified in this disclosure to ophthalmologic imaging devices other than OCT devices.

In the continuous driving operation, the control unit may apply a continuous driving signal that causes the optical scanning unit to repeatedly project light on at least part of the next scanning position (i.e., the next scanning line), which is set with an assumption that no positional deviation between the front images in the scanning position setting operation is generated, to the optical scanning unit until the next partial image data acquisition operation starts. During the image capturing process, the subject eye is fixated, so the subject eye is less likely to move during the image capturing process and even if the subject eye does move, the amount of movement is usually small. Therefore, the distance between the next scanning position (sometimes referred to as the "expected scanning position") that is set with an assumption that no positional deviation between the front images (i.e., positional deviation of the tissue of the subject eye) and the next scanning position that is actually set based on the detected positional deviation is usually small. Therefore, by repeatedly projecting light on at least part of the expected scanning position (i.e., the expected scanning line) during the continuous driving operation of the optical scanning unit, the average time required to shift the driving state of the optical scanning unit to the partial image acquisition operation based on the actually-set next scanning position can be further shortened.

In the scanning position setting operation, the control unit may set the next scanning position based on the positional deviation of the front image that is currently captured in real time by the front observation optical system and the front image that was captured when the previous scanning position was set (that is, the positional deviation between the current tissue and the tissue at the time of setting the previous scanning position). In this case, in the continuous driving operation, the control unit may generate a continuous driving signal after setting the expected scanning position based on the front image that was captured when the previous scanning position was set. In this case, the continuous driving operation of the optical scanning unit is performed on the assumption that no positional deviation of the tissue is generated from the time of setting the previous scanning position. Therefore, the accuracy of the continuous driving operation is likely to be further improved. Also, the control unit may repeatedly project light over the entire expected scanning position (i.e., the entire expected scanning line) or a part of the entire expected scanning position during the continuous driving operation.

Furthermore, the control unit may generate a continuous driving signal based on at least the scanning start point of the next scanning position (i.e., the next scanning line) that is set when no positional deviation between the front images in the scanning position setting operation is generated. Specifically, the control unit may generate a continuous driving signal so that the continuous driving operation is performed in the vicinity of the next scanning start point. The control unit may generate a continuous driving signal so that the scanning position (line) during the continuous driving operation partially includes the scanning start point of the next scanning position (line). In this case, the average time required to shift the driving state of the light scanning unit to the partial image data acquisition operation at the actually-set next scanning position can be further shortened.

The technology of continuously driving the optical scanning unit until the optical scanning unit starts the partial image data acquisition operation at the next scanning position is useful even when the tracking process as described above is not performed. For example, even when multiple scanning lines at least one of which has different shapes, lengths, angles, etc., are set during the image capturing process (for example, radial scanning where light is projected to each of multiple ring-shaped scanning lines arranged in concentric circles, or scanning where a ring-shaped scanning line is switched to a straight-line scanning position), the time required to capture the image is appropriately shortened by continuously driving the optical scanning unit. Also, if time is required after the partial image data acquisition operation at a scanning position completed until the partial image data acquisition operation at a next scanning position starts due to the inertia of the deflection portion (for example, when the angle of scanning for a scanning position and the angle of scanning for the next scanning position are significantly different), the time required to capture an image is appropriately shortened by continuously driving the optical scanning unit.

When a single continuous driving operation, which is one of the continuous driving operations based on a single continuous driving signal is completed by the optical scanning unit, the control unit may repeat the single continuous driving operation of the optical scanning unit based on the continuous driving signal if setting of the next scanning position at the scanning position setting operation is not completed. When the single continuous driving operation is completed, the control unit may shift the driving state of the optical scanning unit to the next partial image data acquisition operation if the setting of the next scanning position at the scanning position setting operation is completed. In this case, regardless of the timing of completion of setting the next scanning position, the driving state of the optical scanning unit can smoothly be shifted from the continuous driving operation to the partial image data acquisition operation at the next scanning position.

Embodiment

Hereinafter, one embodiment according to the present disclosure will be explained. As an example, the ophthalmologic imaging device 1 in this embodiment is an OCT device that is able to capture at least one of a two-dimensional tomographic image, a three-dimensional tomographic image, OCT angiography (OCT angio data), and a two-dimensional front view image (for example, an Enface image generated based on the three-dimensional tomographic image of a tissue viewed from in a front side direction along the optical axis of the measurement light) of a fundus tissue of the subject eye E (an examination subject) which is a target object. However, as described above, the ophthalmologic imaging device in this disclosure is not necessarily limited to an OCT device that captures fundus tissue. Also, the technology exemplified in this disclosure can be applied to imaging devices that capture images of biological tissues other than a subject eye E (for example, skin, digestive organs, brain, etc.). The OCT images are images taken based on the principle of Optical
(Outline of the Ophthalmologic Imaging Device)

Figure 1:
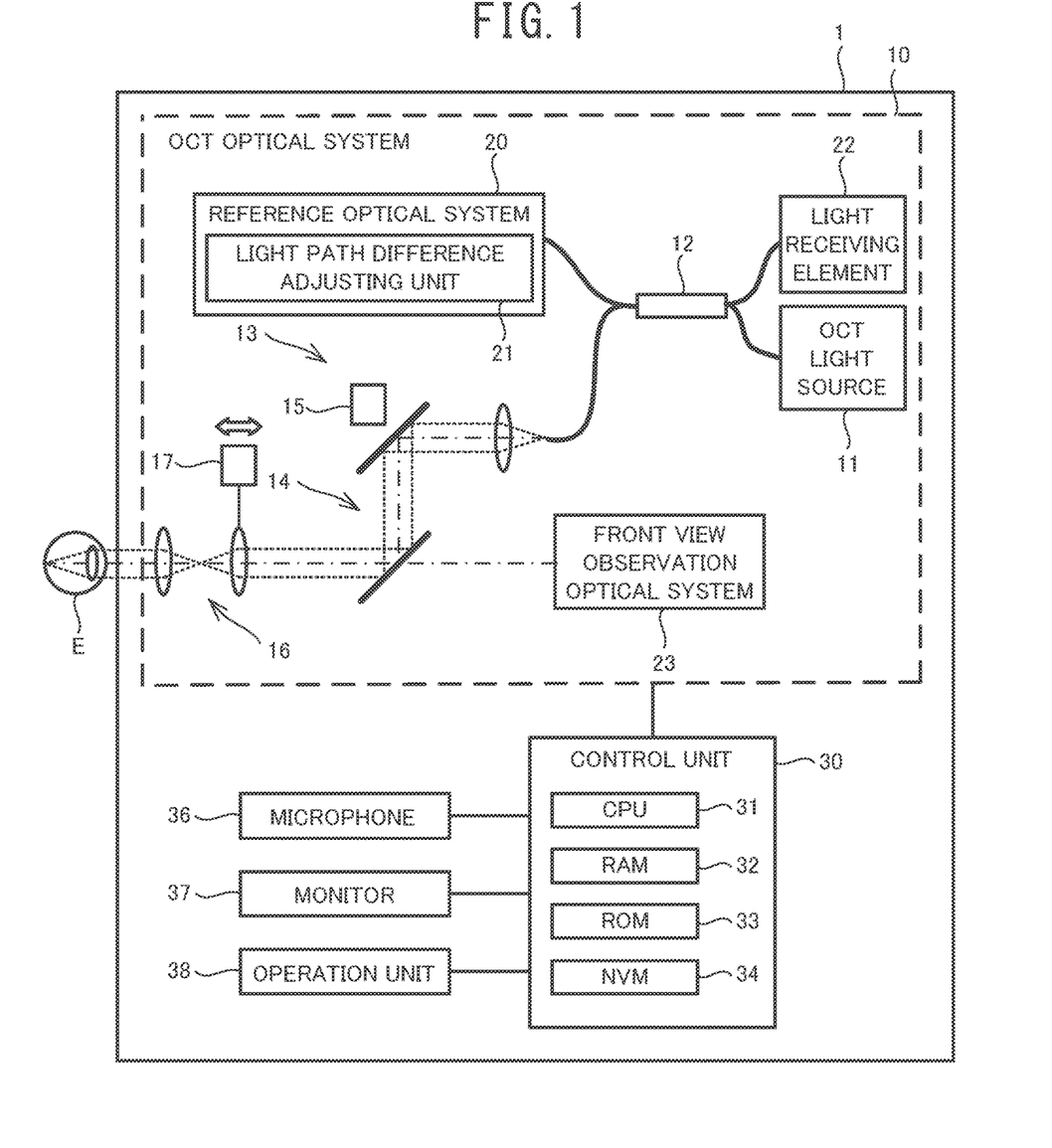
FIG. 1 is a block diagram showing a schematic configuration of an ophthalmologic imaging device.

Referring to FIG. 1, an outline of the ophthalmologic imaging device 1 according to this embodiment will be described. The ophthalmologic imaging device 1 in this embodiment captures OCT images of the subject eye E. The ophthalmologic imaging device 1 includes an OCT optical system 10 and a control unit 30. The OCT optical system 10 includes a light source (OCT source) 11, a coupler (optical splitter) 12, a measurement optical system 13, a reference optical system 20, a light receiving element 22, and a front observation optical system 23.

The light source 11 emits light (in this embodiment, OCT light) for capturing images. The coupler 12 splits the light emitted from the light source 11 into measurement light and reference light. Further, the coupler 12 of the present embodiment multiplexes the measurement light reflected by a tissue (a fundus of the subject eye E in the present embodiment) and the reference light generated by the reference optical system 20 and causes the measurement light and the reference light to interfere each other. That is, the couple 12 of the present embodiment functions as both a branching optical element that splits the OCT light into the measurement light and the reference light and a multiplexing optical element that multiplexes a reflection light of the measurement light and the reference light. However, at least one of the branching optical element and the multiplexing optical element may be modified. For example, an element other than the coupler (for example, circulator, beam splitter, or the like) may be used as the optical element.

The measurement optical system 13 guides the measurement light split by the coupler 12 to a subject and returns the measurement light reflected by the tissue to the coupler 12. The measurement optical system 13 includes an optical scanning unit (a scanner) 14, an irradiating optical system 17, and a focus adjusting unit 17. The optical scanning unit 14 is driven by a driving unit 15 to scan a subject with measurement light in a two-dimensional direction crossing the optical axis of the measurement light. In the present embodiment, two galvanometer mirrors that polarize the measurement light in different directions are used as the optical scanning unit 14. The optical scanning unit 14 will be described in detail later with reference to FIG. 2. The irradiating optical system 17 is arranged at a downstream side of the optical scanning unit 14 in a light path (namely, a position close to the subject) to emit the measurement light onto a tissue. The focus adjusting unit 18 adjusts the focus position of the OCT optical system 10 in a direction along the optical axis (i.e., the depth direction of the tissue) of the measurement light of the OCT optical system 10. As an example, the focus adjusting unit 18 in this embodiment adjusts the focus of the measurement light by moving an optical element (for example, a lens) provided in the irradiating optical system 17 in a direction along the optical axis of the measurement light.

The reference optical system 20 generates the reference light and returns the reference light to the coupler 12. The reference optical system 20 of the present embodiment generates the reference light by reflecting the reference light split by the coupler 12 using a reflection optical system (for example, a reference mirror). However, the reference optical system 20 may be also modified. For example, the reference optical system 20 may transmit the light incident from the coupler without reflecting the light and then return the light to the coupler 12. The reference optical system 20 includes a light path difference adjusting unit 21 that changes a difference between a light path of the measurement light and a light path of the reference light. In the present embodiment, the reference mirror is moved in the optical axis to change the difference of the light paths. A member that changes the difference of the light paths may be disposed in the light path of the measurement optical system 13.

The light receiving element 22 receives light from the tissue irradiated with the light emitted by the optical scanning unit 14. Specifically, the light receiving element 22 of this embodiment receives the interference light of the measurement light and the reference light generated by the coupler 12 to detect an interference signal. The present embodiment uses a principle of Fourier domain OCT In the Fourier domain OCT, spectrum intensity (spectrum interference signal) of the interference light is detected by the light receiving element 22 so that a plurality of OCT signals are acquired through the Fourier transform against the spectrum intensity data. As one example of the Fourier domain OCT Spectral-domain-OCT (SD-OCT), Swept-source-OCT (SS-OCT) or the like can be adopted. Further, for example, Time-domain-OCT (TD-OCT) can be also adopted.

In this embodiment, SD-OCT is adopted. In case of using SD-OCT a low-coherence light source (a broadband light source) may be used as the light source 11, and a spectroscope optical system (spectrometer) that spectrally decomposes the interference light into each frequency component (i.e., each wavelength component) is disposed near the light receiving element 22 in the optical path of the interference light. In case of using SS-OCT a wavelength scanning light source (a wavelength variable light source) that changes the emission wavelength rapidly over time may be used as the light source 11. In this case, the light source 11 may include a fiber ring resonator and a wavelength selection filter. As a wavelength selection filter, a filter including a diffraction grating and a polygon mirror or a filter using a Fabry-Perot etalon may be used.

The front observation optical system 23 is configured to capture a front image of the subject's tissue (in this embodiment, the fundus of the subject eye E). The front image in this embodiment is a two-dimensional image of the tissue viewed from a front side in a direction (a frontal direction) along the optical axis of the OCT measurement light. The configuration of the front observation optical system 23 may be formed of at least one of a scanning laser ophthalmoscope (SLO), a fundus camera, and an infrared camera that illuminates infrared light in a two-dimensional capturing range and captures a front image. Also, the ophthalmologic imaging device 1 of this embodiment may acquire a three-dimensional OCT data of the tissue, and acquire an image (so-called an "Enface image") of the tissue viewed from a front side in a direction (a frontal direction) along the optical axis of the measurement light as a front image. If the Enface image is acquired, the front observation optical system 23 may be omitted. In other words, the OCT optical system 10 may also serve as a front observation optical system.

The control unit 30 performs various controls for the ophthalmologic imaging device 1. The control unit 30 includes a CPU 31, RAM 32, ROM 33, and non-volatile memory (NVM) 34. The CPU 31 is a controller that performs various controls. The RAM 32 temporarily stores various types of information. The ROM 33 stores programs to be executed by the CPU 31 and various initial values, etc. The NVM 34 is a non-transitory storage medium that keeps the stored contents even when the power supply is cut off. The ophthalmologic imaging control program for performing an ophthalmologic imaging process (see FIG. 4) may be stored in the NVM 34.

A microphone 36, a monitor 37, and an operation unit 38 are connected to the control unit 30. The microphone 36 inputs sound. The monitor 37 is an example of a display unit that displays various images. The operation unit 38 is operated by a user to input various operation instructions into the ophthalmologic imaging device 1. The operation unit 38 may be various devices such as a mouse, keyboard, touch panel, foot switch, etc. Also, various operation instructions may be input into the ophthalmologic imaging device 1 when sound is input into the microphone 36. In this case, the CPU 31 may recognize operation instructions by performing voice-recognition processing on the input sound.

In this embodiment, the ophthalmologic imaging device 1 integrally has the OCT optical system 10 and the control unit 30 that are built into a single housing. However, the ophthalmologic imaging device 1 may include multiple devices housed in different housings. For example, the ophthalmologic imaging device 1 may include an optical device incorporating the OCT optical system 10 and a PC connected to the optical device via wired or wireless connection. In this case, a control unit of the optical device and a control unit of the PC may function together as the control unit 30 of the ophthalmologic imaging device 1.

(Optical Scanning Unit)

Figure 2:
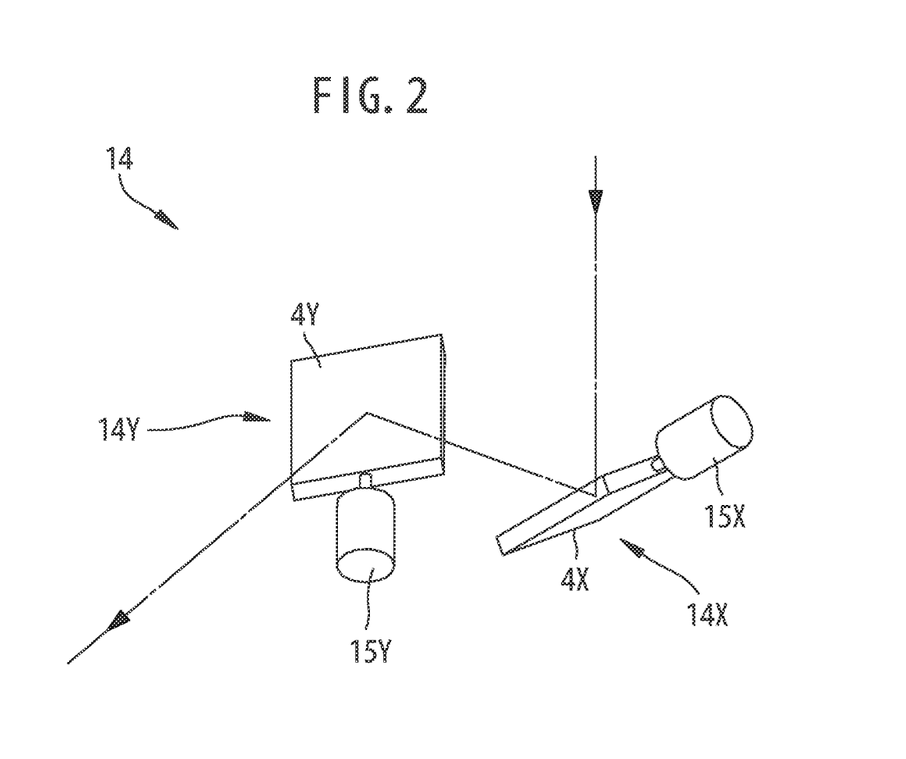
FIG. 2 is a schematic view of an optical scanning unit.

Referring to FIG. 2, the optical scanning unit 14 in this embodiment will be described in detail. The ophthalmologic imaging device 1 in this embodiment includes a first optical scanning unit 14X and a second optical scanning unit 14Y. Both the first optical scanning unit 14X and the second optical scanning unit 14Y scan the tissue with light by oscillating the deflection portions 4 (4X, 4Y) by non-resonant driving. Unlike a resonant-driven optical scanning unit, the optical scanning unit 14 driven by non-resonant driving can precisely control the deflection angle of light by the deflection portions depending on the magnitude of the driving signal. In other words, the optical scanning unit 14 in this embodiment can scan the tissue with light in a state where the projecting position and speed of the light is controlled. As an example, both the first optical scanning unit 14X and the second optical scanning unit 14Y in this embodiment use galvanoscanners. However, as an optical scanning unit, devices other than galvanoscanners (for example, piezo scanners or MEMS scanners, etc.) may be used.

In this embodiment, the oscillation axis of the deflection portion 4X of the first optical scanning unit 14X extends in the Y direction, and the deflection portion 4X scans the object in the X direction crossing (perpendicular in this embodiment) the Y direction. The swing axis of the deflection portion 4Y of the second optical scanning unit 14Y extends in the X direction, and the deflection portion 4Y scans the object in the Y direction. As a result, the light passing through the first optical scanning unit 14X and the second optical scanning unit 14Y is projected in a two-dimensional direction onto the tissue of the subject eye E.

The deflection portion 4X of the first optical scanning unit 14X is connected to the driving unit 15X through the oscillation axis. The driving unit 15X includes an actuator (such as a motor) that rotates (oscillates) the deflection portion 4X, and a potentiometer that detects the position (an angle) of the deflection portion 4X. Similarly, the deflection portion 4Y of the second optical scanning unit 14Y is connected to the driving unit 15Y through the oscillation axis. The driving unit 15Y includes an actuator that rotates (oscillates) the deflection portion 4Y, and a potentiometer that detects the position (angle) of the deflection portion 4Y. The driving unit 15X and driving unit 15Y each include a driver that actually controls driving of the deflection portion 4X, 4Y by the actuator. The driver controls driving of the actuator according to driving signals applied from the CPU 31.

The CPU 31 applies a driving signal to each of the driving unit 15X of the first optical scanning unit 14X and the driving unit 15Y of the second optical scanning unit 14Y. The driving unit 15 (15X, 15Y) precisely controls a deflection angle of light by the deflection portion 4 (4X, 4Y) according to the magnitude of the applied driving signal (i.e., the angle of the deflection portion 4X, 4Y). Also, each driver of the driving units 15X and 15Y controls driving of the deflection portion 4X, 4Y based on a feedback signal indicative of the position (the angle) of the deflection portion 4X, 4Y acquired by the potentiometer, thus allowing more accurate driving of the first and second optical scanning units 14X and 14Y.

Here, at the start of driving of each of the optical scanning units 14X, 14Y, it takes some time from the start of applying the driving signal to each of the optical scanning units 14Y, 14Y until the feedback signal from each of the optical scanning units 14X, 14Y is received by the driver. The driver cannot continue to control driving of the optical scanning units 14X, 14Y for next operation until it receives the feedback signal. Therefore, it takes some time to restart operating the optical scanning units 14X, 14Y when operation of each of the optical scanning units 14X, 14Y is suspended. Also, there may be a case where it takes time to restart operating the optical scanning units 14X, 14Y due to lack of following-up capability of the deflection portions 4X, 4Y of the optical scanning units 14X, 14Y If it takes a long time to restart operating the optical scanning units 14X, 14Y, it would be difficult to shorten the total image capturing time. Therefore, the ophthalmologic imaging device 1 in the present embodiment aims to shorten the image capturing time by executing an ophthalmologic imaging process as will be described later.

Example of an Image Capturing Method

Figure 3:
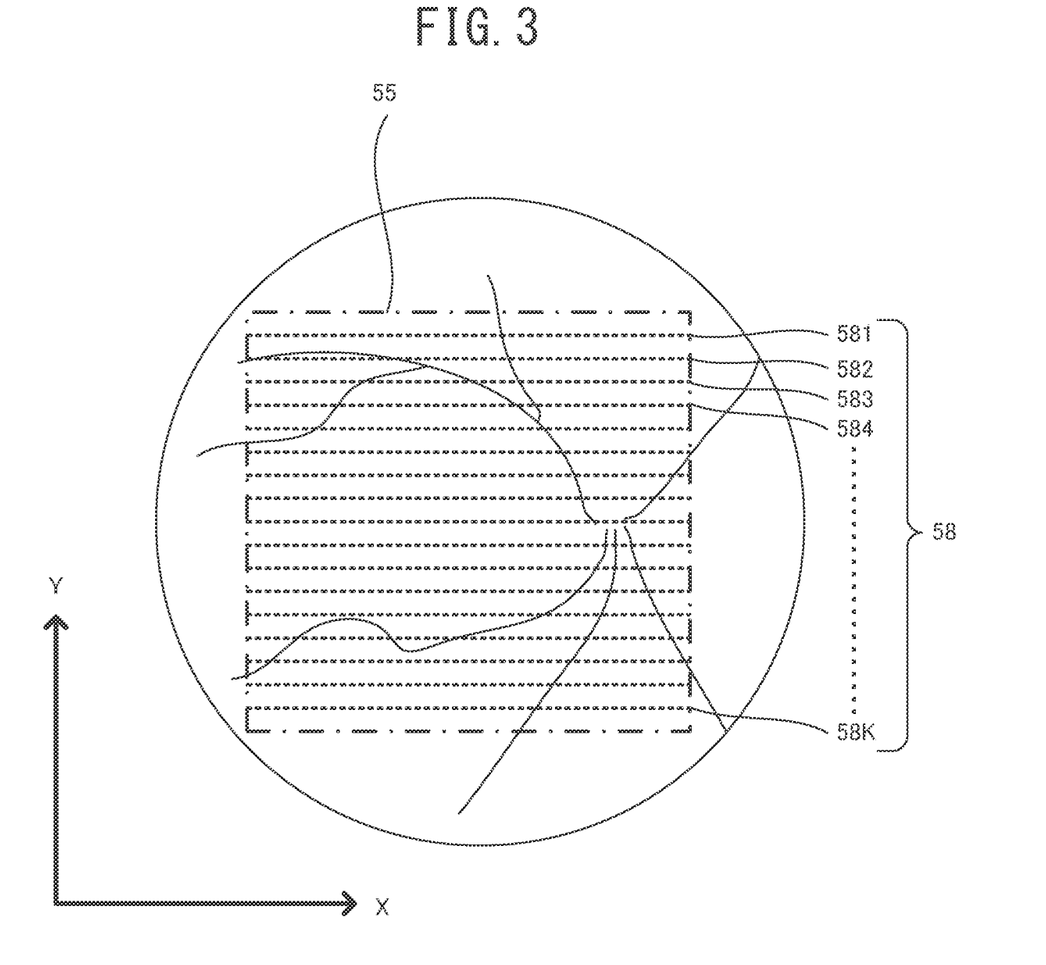
FIG. 3 is an explanatory diagram for illustrating one example of a method for capturing an image.

Referring to FIG. 3 illustrating one example of an image capturing method in the present embodiment. In this embodiment, OCT angiography data in the imaging area 55 is acquired (captured) by scanning a scan target with measurement light spots in a two-dimensional manner by the optical scanning unit 14. The OCT angiography data is motion contrast data generated by performing arithmetic processing on at least two OCT signals acquired at different times for the same position in the subject eye. The OCT angiography data includes perfusion information of a vascular network in the tissue that is useful for diagnosis and so on.

As shown in FIG. 3, the ophthalmologic imaging device 1 of the present embodiment sets multiple scanning positions (in other words, multiple scanning lines) 58 at equal intervals in the two-dimensional imaging area 55 that spreads in a direction intersecting the optical axis of the measurement light. In the example shown in FIG. 3, the scanning positions 58 are arranged at equal intervals in an order of a first scanning position 581, a second scanning position 582, a third scanning position 583, a fourth scanning position 584, and so on with the last scanning position as a "K"th scanning position 58K. The ophthalmologic imaging device 1 captures OCT angiography data in the two-dimensional imaging area 55 by scanning the scan target with the measurement light spots multiple times (in this embodiment, twice for example) at each of the scanning positions 58.

In this embodiment, for a purpose to simplify the explanation, the direction in which the multiple scanning positions 58 are arranged is defined as the X direction, the depth direction of the tissue (that is, the direction along the optical axis of the measurement light) is defined as the Z direction, and the direction perpendicular to both the X direction and the Z direction is defined as the Y direction. In this case, the driving amount and driving time of the second optical scanning unit 14Y, which scans the tissue with light in the Y direction, are very small compared to the driving amount and driving time of the first optical scanning unit 14X, which scans the tissue with light in the X direction. Therefore, the driving method of the first optical scanning unit 14X, which has a larger driving amount and driving time, will be described. However, the same method as the driving method of the first optical scanning unit 14X may also be used when driving the second optical scanning unit 14Y

(Ophthalmologic Imaging Processing)

Figure 4:
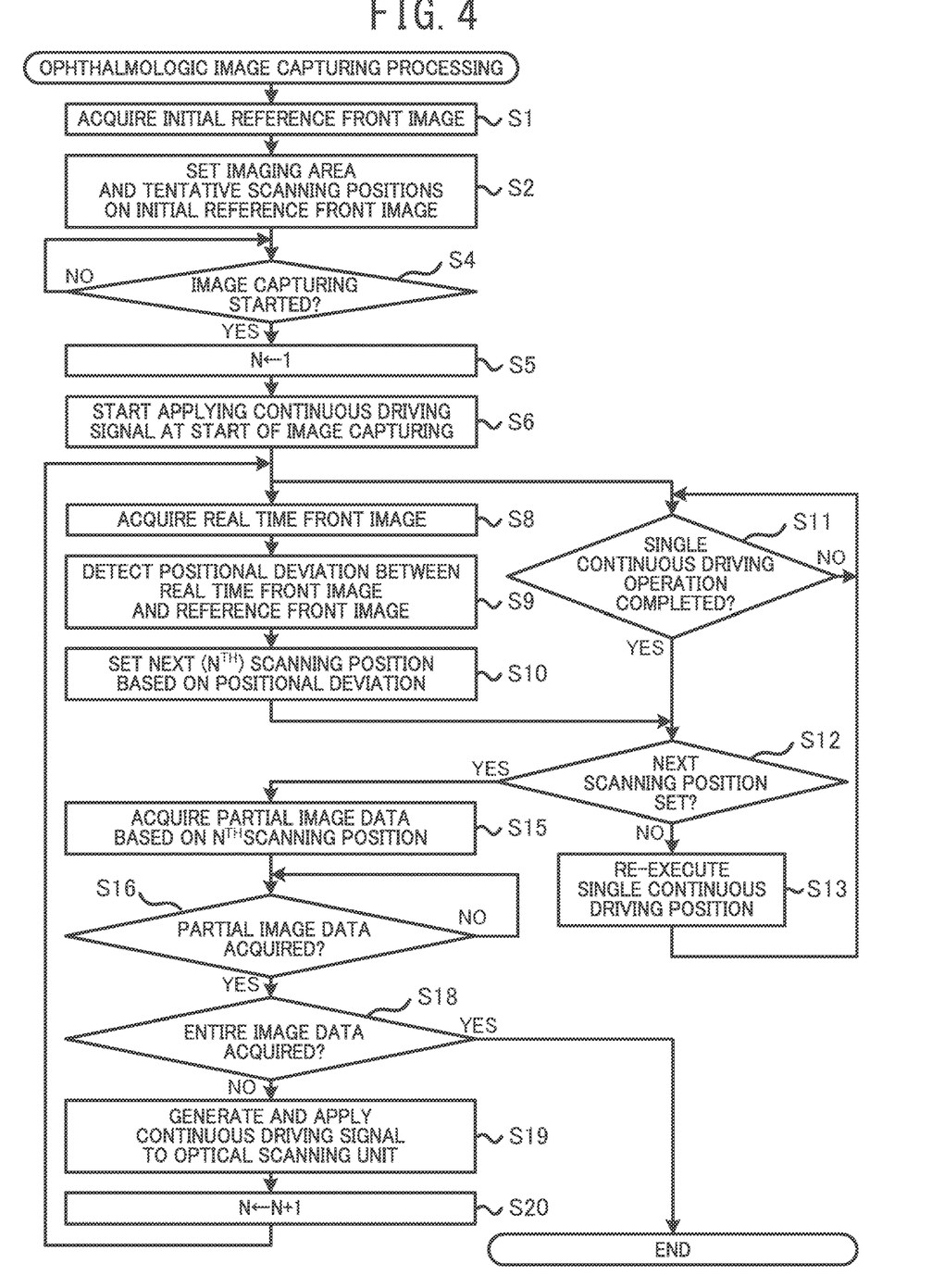
FIG. 4 is a flowchart of ophthalmologic imaging processing performed by the ophthalmologic imaging device.
Figure 5:
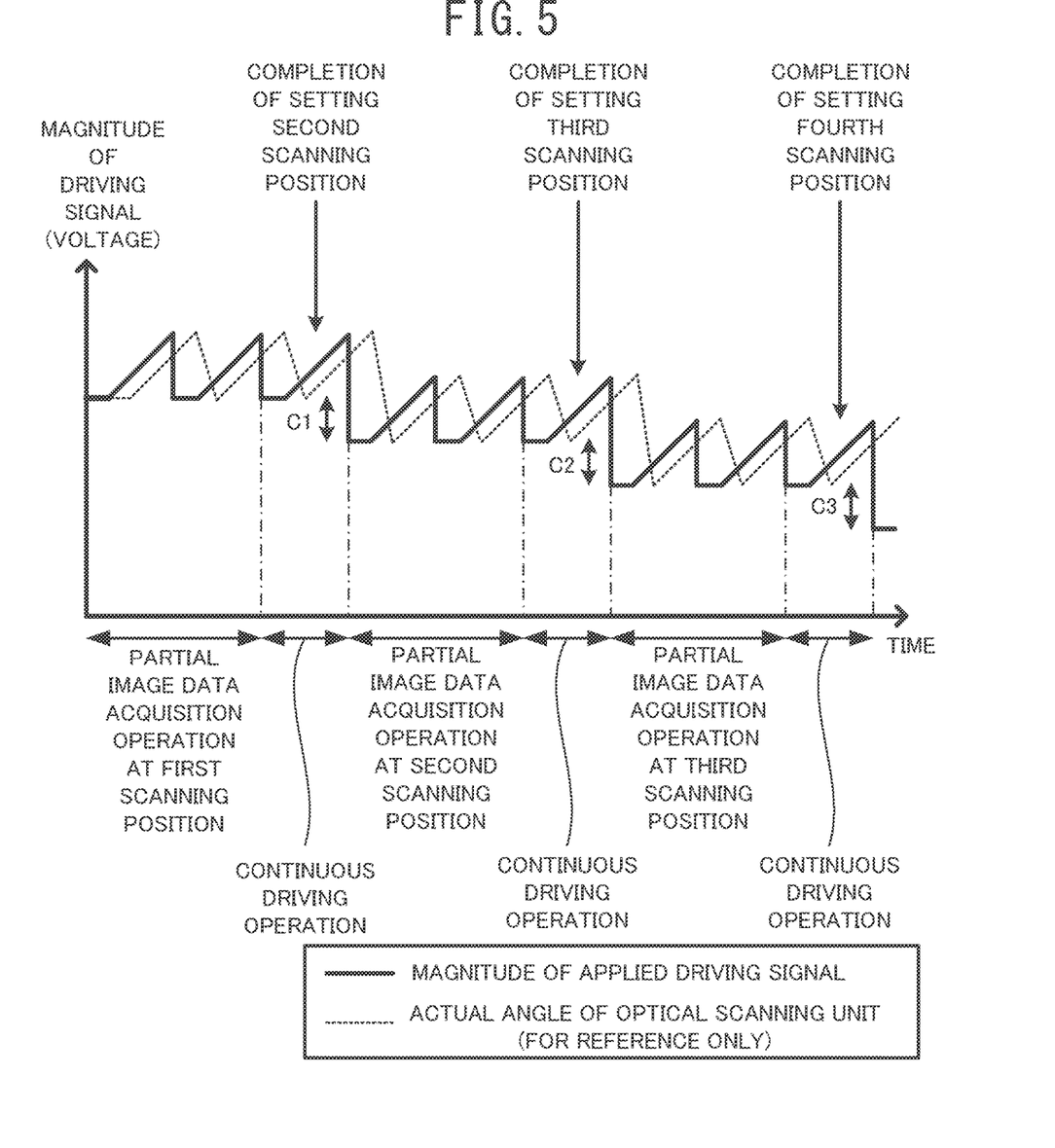
FIG. 5 is an example of a graph showing the size of each of driving signals applied to a first optical scanning unit over time according to first and third aspects of methods for generating continuous driving signals.
Figure 6:
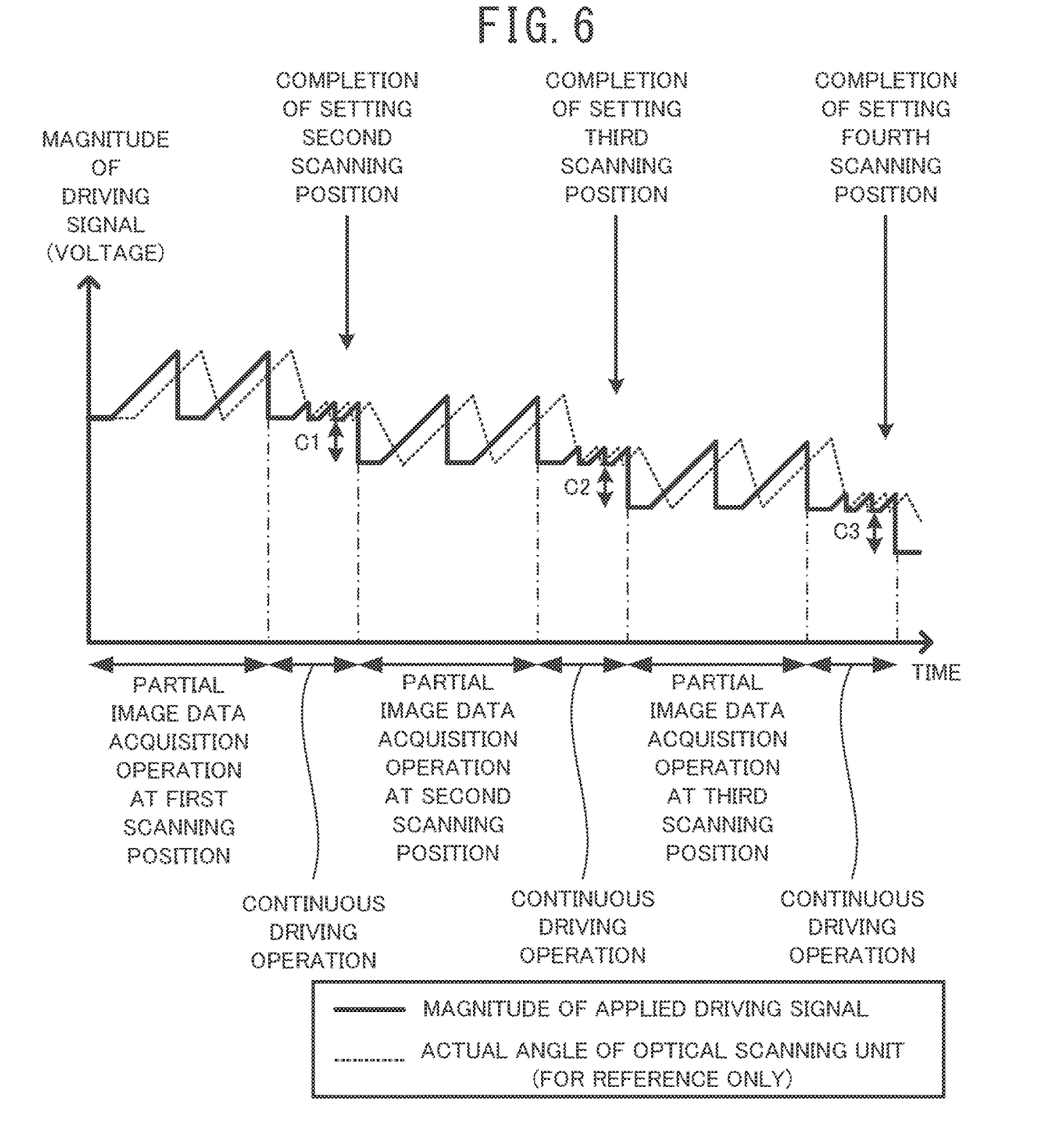
FIG. 6 is an example of a graph showing the size of each of the driving signals applied to the first optical scanning unit over time according to second and third aspects of the methods for generating the continuous driving signals.

Referring to FIGS. 4 to 6 illustrating one example of ophthalmologic imaging processing performed by the ophthalmologic imaging device 1 in this embodiment. As described above, the ophthalmologic imaging process illustrated in FIG. 4 is a process for capturing OCT angiography data of a fundus of a subject eye E using the imaging method shown in FIG. 3. However, at least a part of the processes shown in FIG. 4 can also be applied when capturing images other than the OCT angiography data (for example, two-dimensional tomographic images, three-dimensional tomographic images, addition average images, two-dimensional front images, etc.). The CPU 31 of the ophthalmologic imaging device 1 executes the ophthalmologic imaging process shown in FIG. 4 in accordance with the ophthalmologic imaging control program stored in the NVM 34.

First, the CPU 31 acquires an initial reference front image of the tissue (in this embodiment, the fundus of the subject eye E). The initial reference front image is an image that serves as a first reference for setting multiple scanning positions 58. In this embodiment, a two-dimensional front image of the tissue of the subject eye E captured by the front observation optical system 23 is acquired as an initial reference front image.

The CPU 31 sets the imaging area 55 (see FIG. 3) for acquiring image data on the initial reference front image acquired at S1, and sets multiple tentative scanning positions within the set imaging area 55 (S2). The tentative scanning positions are scanning positions (scanning lines) for the light (measurement light) assuming that no positional deviation (i.e., movement) of the tissue of the subject eye E is generated during image capturing processing. In other words, if the tissue of the subject eye E does not move at all during the image capturing processing, capturing all images within the imaging area 55 are completed by driving the optical scanning unit 14 so as to scan the light at the tentative scanning positions set at S2. After that, the step of S4 is repeated as a waiting state until a trigger for instructing for the start of capturing image is input (S4: NO).

When a trigger for instructing for the start of capturing an image is input, the CPU 31 sets the value of a counter N to its initial value "1" (S5). The counter N specifies the order of multiple scanning positions 58 which will be set later.

Next, the CPU 31 generates a continuous driving signal at the start of capturing and begins applying the generated continuous driving signal to the optical scanning unit 14 (S6). The continuous driving signal at the start of capturing an image is a driving signal for continuing to drive the optical scanning unit 14 until operation of the optical scanning unit 14 to scan light on the tissue at the first scanning position 581 starts. As described above, it would take a certain amount of time until the optical scanning unit 14 actually starts operating after the driving signal was applied to the optical scanning unit 14 which was temporally stopped. However, if the driving signal is received while the optical scanning unit 14 is operating, a time period until the optical scanning unit 14 starts operating based on the newly received driving signal tends to be shortened. Therefore, by controlling the optical scanning unit 14 to keep operating (i.e., keep moving) by the continuous driving signal at the start of capturing an image applied to the optical scanning unit 14, the optical scanning unit 14 can start scanning operation at the first scanning position 581 (i.e., partial image data acquisition operation) instantly as compared to when the optical scanning unit 14 is stopped once and then restarts operation for scanning at the first scanning position 581.

The method for generating the continuous driving signal at the start of capturing an image can be appropriately selected. As one example, in this embodiment, under an assumption that no positional deviation due to the movement of the tissue of the subject eye E is generated, the CPU 31 generates a driving signal to project light to at least a part of the first tentative scanning position (i.e., the first tentative scanning line) set at S2 or any position including a scanning start point of the tentative scanning position (i.e., the start point of the first tentative scanning line) as the continuous driving signal at the start of capturing an image. During capturing of the image, the subject eye E is fixated, so the subject eye E is less likely to move during capturing and even if the subject eye E does move, the amount of movement is usually small. Therefore, by generating the continuous driving signal at the start of capturing an image so as to control the light to be projected at the first tentative scanning position or its vicinity, the transition time from the driving state of the optical scanning unit 14 based on the continuous driving signal at the start of capturing to the driving state for projecting the light at the first scanning position 581 that will be set later can be further shortened.

Next, the CPU 31 performs, in parallel, processes for setting the Nth scanning position 58 (S8 to S10) and processes for continuously driving the optical scanning unit 14 (S11 to S13).

First, the process for setting the Nth scanning position 58 (S8 to S10) will be described. The CPU 31 acquires a front image of the tissue (fundus) that is currently taken in real-time by the front observation optical system 23 (hereinafter, referred to as a "real-time front image") (S8). The CPU 31 detects a positional deviation due to the movement of the tissue by detecting a positional deviation between the real-time front image and a reference front image that is a front image taken in the past (i.e., a front image that was taken before the real-time front image is taken) by the front observation optical system 23 (S9). As an example, in this embodiment, the front image taken by the front observation optical system 23 when setting the (N−1)th scanning position 58 (or the initial reference front image obtained at S1 when N=1) is used as the reference front image. However, the reference front image can be changed. For example, at S9, the initial reference front image obtained at S1 may always be used as the reference front image.

Also, the actual method for detecting the positional deviation between the real-time front image and the reference front image can be appropriately selected. For example, the CPU 31 may detect feature positions (such as feature points) by performing known image processing on each of the real-time front image and the reference front image, and may detect the positional deviation by comparing each of the detected feature positions. The detection of the positional deviation may be performed by a control unit of a device different from the ophthalmologic imaging device 1 (e.g., a device connected to the ophthalmologic imaging device 1).

The CPU 31 sets the Nth scanning position 58 corrected in view of the positional deviation detected at S9. In this embodiment, the CPU 31 sets the Nth scanning position 58 by correcting the position and the angle of the Nth tentative scanning position set at S2 in view of the direction, distance, and rotation angle of the positional deviation detected at S9. As a result, the tracking process for adjusting the scanning position 58 so as to follow the movement of the tissue is properly executed. After that, the process proceeds to S12 and then to a process (S15) for acquiring partial image data at the Nth scanning position 58 (S15). The partial image data refers to a part of the entire image data of the tissue obtained by the ophthalmologic capturing process.

Next, a process related to the continuous driving operation of the optical scanning unit 14 (S11 to S13) will be described. The CPU 31 determines whether operation of the optical scanning unit 14 by a single continuous driving signal has been completed (S11). The single continuous driving signal is one of a plurality of continuous driving signals and the single continuous driving signal may be repeatedly applied to the optical scanning unit 14. The operation based on the single continuous driving signal is referred to as a "single continuous driving operation". As an example, at S11 in this embodiment, it is determined whether the single continuous driving signal has been applied to the optical scanning unit 14. If the single continuous driving operation has not been completed (S11: NO), the process at S11 is repeated as a waiting state.

When the single continuous driving operation is completed (S11: YES), the CPU 31 determines whether setting of the next scanning position 58 (that is, the setting of the Nth scanning position 58 executed at S8 to S10) has been completed (S12). If the setting of the Nth scanning position 58 has not been completed (S12: NO), the partial image data acquisition operation based on the Nth scanning position 58 cannot be executed. Therefore, the CPU 31 re-executes the application of the continuous driving signal to the optical scanning unit 14 (S13), and the process returns to S11. In other words, the single continuous driving operation of the optical scanning unit 14 is repeated until the setting of the next scanning position 58 is completed.

When the single continuous driving operation is completed (S11: YES), and if the setting of the next scanning position 58 has also been completed (S12: YES), the CPU 31 applies a driving signal to the optical scanning unit 14, which is continuously operating, to project light at the next Nth scanning position 58 (i.e., a driving signal to cause the optical scanning unit 14 to perform the partial image data acquisition operation at the next scanning position 58), and acquires the partial image data based on the Nth scanning position 58 from the light signal received by the light receiving element 22 (S15). That is, the driving state of the optical scanning unit 14 transitions from the continuous driving operation to the partial image data acquisition operation at the next scanning position 58 without temporally stopping operation of the optical scanning unit 14. As a result, because the partial image data acquisition operation of the optical scanning unit 14 at the Nth scanning position 58 starts instantly (continuously), the time necessary for capturing the partial images is appropriately shortened.

When the partial image data acquisition operation at the Nth scanning position 58 is completed (S16: YES), the CPU 31 determines whether all the partial image data acquisition operations (that is, the partial image data acquisition operation based on the last scanning positions 58) have been completed (S18). If all the partial image data acquisition operations have not been completed (S18: NO), the CPU 31 repeatedly generates the continuous driving signals to continuously operate the optical scanning unit 14 until the partial image data acquisition operation based on the next scanning position 58 starts. The CPU 31 starts applying the generated continuous driving signal to the optical scanning unit 14 (S19). The actual method for generating the continuous driving signals will be described later with reference to FIGS. 5 and 6.

Next, the CPU 31 adds "1" to the counter N that specifies the order of the scanning positions 58 (S20). After that, the process for setting the Nth scanning position 58 (S8 to S10) and the process related to the continuous driving operation of the optical scanning unit 14 (S11 to S13) are executed in parallel again. When all the partial image data acquisition operations are completed (S18: YES), the ophthalmologic capturing process ends.

(Method for Generating the Continuous Driving Signals)

Referring to FIGS. 5 and 6, several examples of a method for generating the continuous driving signals (S19) will be described. FIGS. 5 and 6 are graphs showing the magnitude of each of the driving signals (in this embodiment, the value of the driving voltage) applied to the optical scanning unit 14 over time. In FIGS. 5 and 6, the horizontal axis represents time, and the vertical axis represents the magnitude of each driving signal. The graph shown by the solid line represents the magnitude of the driving signals applied to the optical scanning unit 14. Also, as a reference, the actual angle of the optical scanning unit 14 driven according to the applied driving signals is shown by the dotted line. The actual angle of the optical scanning unit 14 changes slightly delayed in time relative to the applied driving signals.

In this embodiment, the continuous driving signals are applied to both the first optical scanning unit 14X and the second optical scanning unit 14Y However, as described above, the description is simplified by explaining only a method for driving the first optical scanning unit 14X which has a larger driving amount and driving time.

In the examples shown in FIGS. 5 and 6, as a result of the so-called tracking process (see S8 to S10 in FIG. 4), the driving signal for performing light scanning at each scanning position 58 is generated so that the positional deviation of the tissue of the subject eye E in the X direction is appropriately corrected (see C1, C2, C3 in the figure).

A first aspect in the method for generating the continuous driving signals will be described below. During the first aspect, the CPU 31 generates a continuous driving signal to cause the optical scanning unit to repeatedly project light over the entire previous scanning position 58 (i.e., the previously-set scanning line) until the partial image data acquisition operation by the optical scanning unit 14 at the next scanning position 58 starts. As a result, as shown in FIG. 5, according to the first aspect, the driving signal that was used in the previous partial image data acquisition operation at the previous scanning position 58 (the driving signal for "Nth scanning position operation" shown in FIG. 5) is also used as the continuous driving signal. Therefore, the CPU 31 does not need to newly generate a continuous driving signal. Thus, the capturing time is appropriately shortened with simple control. It should be noted, in the example shown in FIG. 5, the setting of the next scanning position 58 is completed during the single continuous driving operation. As a result, the partial image data acquisition operation at the next scanning position starts without repeatedly executing the singly continuous driving operation several times.

Next, the second aspect in the method for generating the continuous driving signal will be described below. During the second aspect, the CPU 31 generates the continuous driving signal to cause the optical scanning unit 14 to repeatedly project light over a part of the previous scanning position 58 (in the example shown in FIG. 6, a part including the scanning start point of the previous scanning position 58 (i.e., the start point of the previous scanning line)) until the partial image data acquisition operation at the next scanning position 58 starts. As a result, as shown in FIG. 6, according to the second aspect, the continuous driving signal can be generated using the driving signal that was used to project light at the previous scanning position 58, so the signal generation process is less likely to be complicated. Also, compared to the first aspect, the time required for performing the single continuous driving operation cam be shortened. Therefore, if the setting of the next scanning position 58 is completed during one of the single continuous driving operations of the optical scanning unit 14, the average time necessary to transition to the partial image data acquisition operation of the optical scanning unit 14 at the next scanning position 58 after the continuous driving process completed can be further shortened.

In the example shown in FIG. 6, to facilitate understanding of the continuous driving operation of the optical scanning unit 14, the driving amount (driving cycle) in a single continuous driving operation is represented larger than the actual driving amount. As a result, in the example shown in FIG. 6, the operation waveform of the optical scanning unit 14 based on the continuous driving signal looks jagged. However, it is desirable to minimize the driving amount in the single continuous driving operation. In this embodiment, a continuous driving signal for continuously driving the optical scanning unit 14 with the minimum driving amount within a range where the optical scanning unit 14 can be driven in a stable state (for example, a driving signal with a control waveform of the minimum table size that is feasibly allowed under a specification of the optical scanning unit 14) is applied to the optical scanning unit 14. As a result, the average time to transition to the partial image data acquisition operation of the optical scanning unit 14 at the next scanning position 58 after the continuous driving operation completed is further shortened.

The waveform of the continuous driving signal is not necessarily limited to the jagged waveform shown in FIG. 6. In other words, as long as the scanning unit 14 does not stop operation, the waveform of the continuous driving signal can be any waveform.

Even when light is not projected on at least a part of the previous scanning position 58, by applying a process for continuously driving the optical scanning unit 14 with the minimum driving amount within the range where the optical scanning unit 14 can be driven in a stable state, the time required to capture an image is appropriately shortened. For example, a continuous driving signal may be generated to continuously drive the optical scanning unit 14 with the minimum driving amount within the range where the optical scanning unit 14 can be driven in a stable state in the vicinity of the next scanning start point (for example, a position including the scanning start point of an expected next scanning position (i.e., the start point of an expected next scanning line), which will be described later). In this case, the capturing image time can be easier shortened further.

A third aspect of the method for generating a continuous driving signal will be described. In the third embodiment, the CPU 31 generates a continuous driving signal to cause the optical scanning unit 14 to repeatedly project light on at least part of the next scanning position 58 (a portion of an expected next scanning line) that is set assuming that no positional deviation is generated during the detection process (refer to S8 and S9 in FIG. 4) of the positional deviation between front images for setting the next scanning position 58. As the subject eye E is fixed during the image capturing processing, the subject eye E is likely to not move, and even if the subject eye E moves, the amount of movement is usually small. Therefore, the distance between the expected next scanning position that is expected assuming that no positional deviation of the tissue of the subject eye E is generated and the next scanning position 58 that is actually set based on the detected positional deviation tends to be small. Therefore, according to the third aspect, the average time until the transition to the partial image data acquisition operation of the optical scanning unit 14 at the next scanning position 58 that is actually set is likely to be further shortened.

For example, when the partial image data acquisition operation of the optical scanning unit 14 at the Nth scanning position 58 is completed, the CPU 31 may set the (N+1)th scanning position 58 (the expected scanning position) assuming that no positional deviation is generated based on the front image acquired at S8 when setting the Nth scanning position 58. The CPU 31 may generate a driving signal to project light at the set expected scanning position as a continuous driving signal. In this case, assuming that no positional deviation of the tissue is generated from setting of the previous scanning position 58, the continuous driving operation of the optical scanning unit 14 is executed. Therefore, accuracy of the continuous driving operation can be further improved.

The CPU 31 may repeatedly project light over the entire expected scanning position (i.e., the entire expected scanning line) or a part of the expected scanning position during the continuous driving operation. Also, during the continuous driving operation, the CPU 31 may repeatedly project light at any scanning position including the scanning start point of the expected scanning position. In the example shown in FIG. 3, the range in the X direction of the multiple scanning positions 58 set on the tissue is the same, and only the position in the Y direction is changed. That is, in the example shown in FIG. 3, if no positional deviation of the tissue is generated, the driving signal to the first optical scanning unit 14X corresponding to the Nth scanning position 58 and the driving signal to the first optical scanning unit 14X corresponding to the (N+1)th scanning position 58 are the same. Therefore, in the third embodiment, if light is projected over the entire expected scanning position during the continuous driving operation, the graph of the driving signal applied to the first optical scanning unit 14X will be the same as in FIG. 5. Also, in the third aspect, if light is projected only on part of the expected scanning position during the continuous driving operation, the graph of the driving signal applied to the first optical scanning unit 14X will be the same as in FIG. 6. In the example shown in FIG. 3, if no positional deviation of the tissue is generated, the driving signal to the second optical scanning unit 14Y corresponding to the Nth scanning position 58 and the driving signal to the second optical scanning unit 14Y corresponding to the (N+1)th scanning position 58 are slightly different.

The technology disclosed in the above embodiments is just an example. Therefore, it is possible to modify the technology exemplified in the above embodiments. It is also possible to adopt only a part of the multiple technologies exemplified in the above embodiments. For example, the process of applying the continuous driving signal at the start of capturing an image (S6) may be omitted. Also, the process of applying the continuous driving signal to the optical scanning unit 14 is useful even when the tracking process (S8, S9) is not performed. For example, even when multiple scanning positions 58 are set between the start and end of one image data acquisition process (for example, when executing radial scanning to emit light at each of multiple annular scanning positions arranged in a concentric circle), the capturing time is properly shortened by continuously driving the optical scanning unit 14 between the partial image data acquisition operations. In addition, the method of generating the continuous driving signal is not necessarily limited to the first to third aspects as described above. In other words, even if the specific contents of the continuous driving signal (positions where light is projected by applying the continuous driving signal, etc.) change by transitioning the driving state of the optical scanning unit 14 from the continuous driving operation to the partial image data acquisition operation at the next scanning position 58 without suspension of the operation, the image capturing time is properly shortened.

The process of setting the next scanning position 58 at S8 to S10 in FIG. 4 is an example of a "scanning position setting operation". The process of acquiring partial image data based on the scanning position 58 at S15 of FIG. 4 is an example of a "partial image data acquisition operation". The process of applying a continuous driving signal to the optical scanning unit 14 at S6, S11 to S13, and S19 of FIG. 4 is an example of a "continuous driving operation step".

The invention claimed is:

1. An ophthalmologic imaging method, implemented by a control unit of an ophthalmologic imaging device that is configured to capture an image of a tissue of a subject eye, the ophthalmologic imaging device including:
   a light source configured to emit light;
   an optical scanning unit that includes a deflection portion configured to deflect light emitted from the light source, the optical scanning unit being configured to sequentially scan light on the tissue at a plurality of scanning positions; and
   a light receiving element that is configured to receive light reflected by the tissue scanned by the optical scanning unit, the method for acquiring entire image data of the tissue by repeatedly performing the steps of:
   setting a scanning position of light for the optical scanning unit to acquire partial image data that is part of the entire image data;
   acquiring the partial image data via the light receiving element by applying, to the optical scanning unit, a driving signal that causes the optical scanning unit to scan light on the tissue at the scanning position that was set this time; and
   continuously operating the optical scanning unit until capturing the partial image data based on a scanning position that will be set next time starts after capturing the partial image data based on the scanning position that was set this time was completed by applying, to the optical scanning unit, a continuous driving signal that causes the optical scanning unit to continuously operate.

2. An ophthalmologic imaging device that captures an image of a tissue of a subject eye, the ophthalmologic imaging device comprising:
   a light source configured to emit light;
   an optical scanning unit that includes a deflection portion configured to deflect light emitted from the light source, the optical scanning unit being configured to sequentially scan light on the tissue at a plurality of scanning positions;
   a light receiving element that is configured to receive light reflected by the tissue scanned by the optical scanning unit; and
   a control unit that includes at least one processor, wherein the at least one processor is programmed to repeatedly perform, to acquire entire image data of the tissue:
   a scanning position setting operation to set a scanning position of light for the optical scanning unit;
   a partial image data acquisition operation to acquire, via the light receiving element, partial image data that is part of the entire image data by applying, to the optical scanning unit, a driving signal that causes the optical scanning unit to scan light on the tissue at the scanning position that was set this time; and
   a continuous driving operation to cause the optical scanning unit to continuously perform an operation other than the partial image data acquisition operation until the partial image data acquisition operation based on a scanning position that will be set next time starts after the partial image data acquisition operation based on the scanning position that was set this time was completed by applying, to the optical scanning unit, a continuous driving signal that causes the optical scanning unit to continuously operate.

3. The ophthalmologic imaging device according to claim 2, wherein
   the at least one processor is further programmed to, during the continuous driving operation, apply the continuous driving signal, to the optical scanning unit, to cause the optical scanning unit to scan light on the tissue at the scanning position that was set this time until the partial image data acquisition operation based on the scanning position that will be set next time starts.

4. The ophthalmologic imaging device according to claim 2, wherein
the at least one processor is further programmed to, during the continuous driving operation, apply the continuous driving signal, to the optical scanning unit, to cause the optical scanning unit to scan light on the tissue at a part of the scanning position that was set this time until the partial image data acquisition operation based on the scanning position that will be set next time starts.

5. The ophthalmologic imaging device according to claim 2, further comprising
a front view observation optical system that is configured to capture a front image of the tissue of the subject eye, wherein
the at least one processor is further programmed to, during the scanning position setting operation:
detect a positional deviation between the front image that is currently captured by the front view observation optical system and the front image that was captured before; and
set a scanning position for the partial image data acquisition operation that will be performed next time based on the detected positional deviation.

6. The ophthalmologic imaging device according to claim 5, wherein
the at least one processor is further programmed to, during the continuous driving operation:
until the partial image data acquisition operation based on the scanning position that will be set next time starts, apply, to the optical scanning unit, the continuous driving signal to cause the optical scanning unit to repeatedly scan light on the tissue at at least a part of a scanning position that is set for the partial image data acquisition operation that will be performed next time under an assumption that no positional deviation is generated.

7. The ophthalmologic imaging device according to claim 2, wherein
the continuous driving operation includes a plurality of single continuous driving operations,
each of the plurality of single continuous operations is a single operation by the optical scanning unit based on the continuous driving signal,
the at least one processor is further programmed to, during the continuous driving operation:
repeatedly apply, to the optical scanning unit, the continuous driving signal to cause the optical scanning unit to repeatedly perform the single continuous driving operation if the scanning position for the partial image data acquisition operation that will be performed next time has not yet been set in the scanning position operation when the optical scanning unit completes the single continuous driving operation; and
cause the optical scanning unit to transition to the partial image data acquisition operation if the scanning position for the partial image data acquisition operation that will be performed next time has been already set in the scanning position setting operation when the optical scanning unit completes the single continuous driving operation.

8. A non-transitory, computer-readable, tangible storage medium storing an ophthalmologic image capturing program, which is executed by at least one processor of an ophthalmologic imaging device configured to capture an image of a tissue of a subject eye, the ophthalmologic imaging device including:
a light source configured to emit light;
an optical scanning unit that includes a deflection portion configured to deflect light emitted from the light source, the optical scanning unit being configured to sequentially scan light on the tissue at a plurality of scanning positions;
a light receiving element that is configured to receive light reflected by the tissue scanned by the optical scanning unit; and
a control unit that includes the at least one processor, the program, when executed by the at least one processor, causing the at least one processor to repeatedly perform, to acquire entire image data of the tissue:
a scanning position setting operation to set a scanning position of light for the optical scanning unit;
a partial image data acquisition operation to acquire, via the light receiving element, partial image data that is part of the entire image data by applying, to the optical scanning unit, a driving signal that causes the optical scanning unit to scan light on the tissue at the scanning position that was set this time; and
a continuous driving operation to cause the optical scanning unit to continuously perform an operation other than the partial image data acquisition operation until the partial image data acquisition operation based on a scanning position that will be set next time starts after the partial image data acquisition operation based on the scanning position that was set this time was completed by applying, to the optical scanning unit, a continuous driving signal that causes the optical scanning unit to continuously operate.

* * * * *